US009441487B2

(12) United States Patent
Keller et al.

(10) Patent No.: US 9,441,487 B2
(45) Date of Patent: Sep. 13, 2016

(54) METHOD FOR WELDING ROTORS FOR POWER GENERATION

(71) Applicant: ALSTOM Technology Ltd, Baden (CH)

(72) Inventors: Sorin Keller, Oberrohrdorf (CH); Werner Martin Balbach, Würenlingen (CH); Gianni Giorgi, Dättwil (CH); Holger Kiewel, Brugg (CH)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 358 days.

(21) Appl. No.: 14/244,971

(22) Filed: Apr. 4, 2014

(65) Prior Publication Data

US 2014/0299580 A1 Oct. 9, 2014

(30) Foreign Application Priority Data

Apr. 4, 2013 (EP) .................................... 13162319

(51) Int. Cl.
*F01D 5/06* (2006.01)
*B23K 9/02* (2006.01)
(Continued)

(52) U.S. Cl.
CPC ............... *F01D 5/063* (2013.01); *B23K 9/028* (2013.01); *B23K 9/0213* (2013.01); *B23K 9/167* (2013.01);
(Continued)

(58) Field of Classification Search
CPC ..... F01D 5/063; B23K 9/0213; B23K 9/167; B23K 9/186; B23K 9/028; B23K 9/18; B23K 33/006; B23K 2201/001; B23K 2201/06; F05D 2230/232
USPC .......................................... 219/74, 75, 137 R
See application file for complete search history.

(56) References Cited

U.S. PATENT DOCUMENTS 5,004,884 A 4/1991 Sakaguchi et al.
5,532,454 A * 7/1996 Kuhnen ............... B23K 33/004 219/137 R (Continued)

FOREIGN PATENT DOCUMENTS

CA 1039089 9/1978
CA 1103762 6/1981

(Continued)

OTHER PUBLICATIONS

Harbin Welding Institute, Welding and Allied Processes, ISO9692-1-2003, publ. Apr. 30, 2006, pp. 1-16, table 1.
DIN EN ISO 9692-2, Welding and allied processes—Joint preparation—Part 2, Sep. 1999, pp. 423-435.

*Primary Examiner* — Christopher Kim
(74) *Attorney, Agent, or Firm* — Buchanan Ingersoll & Rooney PC

(57) ABSTRACT

The invention relates to a method for welding rotors for power generation having a plurality of rotor discs arranged along a rotor axis. The method includes providing forged and NDT tested rotor discs and machining the discs for weld seam preparation. The weld seam preparation has an inner narrow TIG welding gap and an adjoining outer SAW welding gap. The method further includes stapling the discs on top of each other; and checking the run-out of the stapled discs relative to each other and as a whole and, if necessary, adjusting the staple. In addition the method includes melting the root of the weld without weld filler using TIG welding; increasing the weld height by narrow gap TIG welding with parent metal weld filler to allow tilting of the rotor in horizontal position; tilting the rotor in horizontal position; finalizing the welding by filling the outer SAW welding gap using SAW welding; and checking the welds of the rotor by NDT using ultrasonic testing. A weld seam preparation machining step that includes preparing an optimized transition geometry of TIG welding gap to SAW welding gap transition with a first opening having a first opening angle and a second opening having a second opening angle greater than said first opening angle.

7 Claims, 2 Drawing Sheets

70°
30°
30
SAW
29
28
26
R4
TIG

(51) Int. Cl.

| | |
|---|---|
| ***B23K 9/167*** | (2006.01) |
| ***B23K 9/18*** | (2006.01) |
| ***B23K 33/00*** | (2006.01) |
| ***B23K 9/028*** | (2006.01) |

(52) U.S. Cl.

CPC ................. *B23K 9/18* (2013.01); *B23K 9/186* (2013.01); *B23K 33/006* (2013.01); *B23K 2201/001* (2013.01); *B23K 2201/06* (2013.01); *F05D 2230/232* (2013.01)

(56) References Cited

U.S. PATENT DOCUMENTS

| | | | | |
|---|---|---|---|---|
| 6,919,534 | B2 * | 7/2005 | Komai ................. | B23K 33/004 219/137 R |
| 2004/0226931 | A1 * | 11/2004 | Stol .......................... | B23K 9/02 219/137 R |
| 2010/0224597 | A1 | 9/2010 | Keller et al. | |
| 2011/0155711 | A1 * | 6/2011 | Doyle .................. | B23K 9/0956 219/137 R |
| 2011/0250472 | A1 * | 10/2011 | Kamijo ................ | B23K 9/0213 428/685 |
| 2014/0299581 | A1 * | 10/2014 | Keller .................. | B23K 9/0213 219/74 |

FOREIGN PATENT DOCUMENTS

| | | | |
|---|---|---|---|
| CA | 1253810 | | 5/1989 |
| CA | 1275787 | | 11/1990 |
| CA | 2695520 | | 12/2009 |
| CN | 1192076 | A | 9/1998 |
| EP | 0 665 079 | | 8/1995 |
| JP | H10 277744 | | 10/1998 |
| JP | 2909434 | | 4/1999 |
| JP | 2000 102890 | | 4/2000 |
| JP | 2007-278064 | | 10/2007 |
| JP | 2012-250268 | | 12/2012 |
| SU | 634880 | A | 11/1978 |
| WO | 2009/065739 | | 5/2009 |

* cited by examiner

METHOD FOR WELDING ROTORS FOR POWER GENERATION

CROSS-REFERENCE TO RELATED APPLICATIONS

This application claims priority to European application 13162319.1 filed Apr. 4, 2013, the contents of which are hereby incorporated in its entirety.

TECHNICAL FIELD

The present invention relates to the technology of turbomachines. It refers to a method for welding rotors for power generation (gas turbines, steam turbines, generators), which comprise a plurality of rotor discs arranged along a rotor axis, according to the preamble of claim 1.

BACKGROUND

Documents EP 0 665 079 A1 and EP 2 215 329 A1 (resp. WO 2009/065739 A1) describe the principles for welding rotors for power generation (gas turbines, steam turbines, generators), which comprise a plurality of rotor discs arranged along a rotor axis, thereby using tungsten inert gas (TIG) welding, especially very narrow gap TIG for the root area of the welding joint, and afterwards submerged arc welding (SAW) to fill the weld seam.

FIG. 1 (similar to EP 0 665 079 A1) shows a prior art welding joint with a welding seam 13 between two adjacent rotor discs 11 and 12 of a welded rotor 10. Before welding the two discs 11 and 12 abut with a centering step joint 20 of height h, thereby creating an extreme narrow gap 19, which is defined by extreme narrow gap component faces 23 and 24 of the discs 11 and 12, and a narrow gap 14, which is defined by narrow gap component faces 15 and 16 of the discs 11 and 12.

The extreme narrow gap 19 is filled with TIG welding seams 25, each welding seam extending over the full extreme narrow gap width b. The narrow gap 14 is filled with SAW welding seams 17, 18, which are smaller than the narrow gap width a and are alternating butt against the opposing narrow gap component faces 15 and 16, and overlap in the middle of the narrow gap 14. During TIG welding a fusing area 22 at the root of the welding joint is fused. Furthermore, a relieving ridge 21 with a relieving ridge width c and height d and relieving ridge angle a is provided at the root of the welding joint.

The extreme narrow gap TIG weld (welding seams 25) are welded typically in a vertical stack of rotor discs (see for example FIG. 2 of WO 2009/065739 A1) and the subsequently filled SAW weld (SAW welding seams 17, 18) is filled in horizontal position (see for example FIG. 3 of WO 2009/065739 A1). The TIG-SAW transition is shown with a U type weld joint preparation for the SAW area.

The Typical Dimensions of Such a Prior Art Welding Joint Are:

Typical width of TIG extreme narrow gap: b=10 mm. Typical width of SAW narrow gap: a=17 mm.

Thus, according to the prior art, in a first step, the forged and NDT tested discs are machined for weld seam preparation.

Afterwards the discs are stapled on top of each other and their run-out relative to each other and as a whole is checked and, if necessary, adjusted.

Now, with the discs in vertical position the root of the weld is melted without weld filler using TIG welding.

After this the weld height is increased to allow tilting of the rotor in horizontal position using very narrow gap TIG welding with parent metal weld filler.

After tilting the rotor in horizontal position, the welding is finalized, filling the weld using SAW welding.

Finally the welds of the rotor are NDT checked using ultrasonic (US) testing.

As mentioned above already, the welding of rotors for power generation equipment is described in more details in document s EP 0 665 079 A1 and EP 2 215 329 A1.

The welding seam geometries recommended for SAW welding are given in DIN EN ISO 9692-2 tables 1 and 2. The narrow gap from TIG needs to be filled practically to the bottom of the U of the SAW joint preparation. This is not always achievable due to oxygen pick-up without additional machining, or a solution for the transition has to be found, which allows some scatter for the bottom of the U shape joint preparation.

For proper NDT results of the transition area TIG to SAW the inert gas flow would need to be increased by a factor of 3 to 5, if the narrow gap is broadened up towards the end of the narrow gap for TIG.

With the U joint preparation for SAW as well as using U with V root preparation (1.3.7 in DIN EN ISO 9692-2) occasionally NDT indications above acceptance limit are found, which need costly rework.

Thus, the prior art technology for the transition zone between TIG and SAW would need machining after TIG welding and before SAW welding to assure best transition area non-destructive testing (NDT) results. In this case for SAW a weld joint preparation according DIN EN ISO 9692-2 would be done after TIG welding is completed, with characteristic length parameters i, k, l, m, Radius r, and angle β (see FIG. 2).

However, this additional machining after TIG welding is time consuming and increases manufacturing costs.

SUMMARY

It is an object of the present invention to provide a method for welding rotors for power generation (gas turbines, steam turbines, generators), which comprise a plurality of rotor discs arranged along a rotor axis, which method avoids the disadvantages of the prior art methods and substantially reduces manufacturing time and costs.

This object is obtained by a method according to claim 1.

The method according to the invention for welding rotors for power generation (gas turbines, steam turbines, generators), which comprise a plurality of rotor discs arranged along a rotor axis, comprises the steps of:

- providing forged and NDT tested rotor discs;
- machining said discs for weld seam preparation, said weld seam preparation comprising an inner narrow TIG welding gap and an adjoining outer SAW welding gap;
- stapling the discs on top of each other;
- checking the run-out of the stapled discs relative to each other and as a whole and, if necessary, adjusting the staple;
- melting the root of the weld without weld filler using TIG welding;
- increasing the weld height by narrow gap TIG welding with parent metal weld filler to allow tilting of the rotor in horizontal position.
- tilting the rotor in horizontal position;
- finalizing the welding by filling the outer SAW welding gap using SAW welding; and checking the welds of the rotor by NDT using ultrasonic testing.

It is characterized in that said weld seam preparation machining step comprises preparing an optimized transition geometry of TIG welding gap to SAW welding gap transition with a first opening having a first opening angle and a second opening having a second opening angle greater than said first opening angle.

According to an embodiment of the invention said first opening has a V shape.

Specifically, said first opening has an opening angle with about 30° to the vertical.

Specifically, said first opening has a height of a few mm, preferably 3 mm.

According to another embodiment of the invention said second opening has a V shape and goes with a predetermined radius into the sidewall of the SAW welding gap.

Specifically, said second opening has an opening angle with about 70° to the vertical.

Specifically, the predetermined radius is about 4 mm.

BRIEF DESCRIPTION OF THE DRAWINGS

The present invention is now to be explained more closely by means of different embodiments and with reference to the attached drawings.

DETAILED DESCRIPTION

It has been recognized, that additional machining between TIG and SAW welding can be omitted by two possibilities, either (1) by increased inert gas purge for TIG welding near transition to SAW to avoid oxygen pick-up towards the end of TIG welding or (2) by improvement of the at present selected geometry of the transition between TIG and SAW welding sections to reduce risk of oxygen pick-up without changing the design of a currently used narrow gap TIG burner according to document CH 700 542 A1 (equiv. to US 2010/0224597 A1).

According to the present invention, it has been decided to optimize the transition geometry and keep the current inert gas flow constant as the easier and less costly, realizable possibility.

The optimized transition geometry of TIG to SAW weld transition improves NDT results for welded rotors for power generation application. The optimized transition has the following consequences:

It eliminates mechanical work between TIG and SAW.

It eliminates the risk of weld defects at transition TIG to SAW.

SAW welding can be done without further preparation after TIG welding and tilting of rotor to horizontal position.

TIG hot wire can be used instead of cold wire.

Flux cored TIG wire can be used instead of massive TIG wire.

SAW tandem welding can be used instead of typical single welding.

Figure 1:
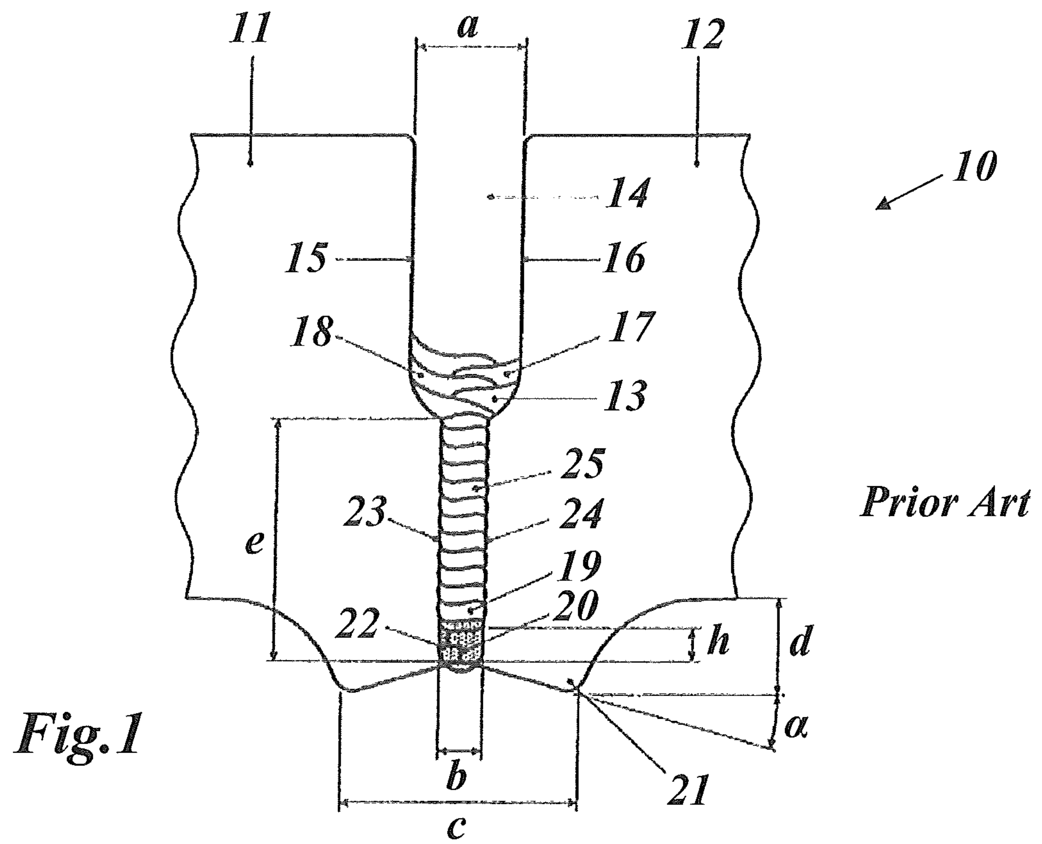
FIG. 1 shows a welding joint between rotor disc according to the prior art.
Figure 2:
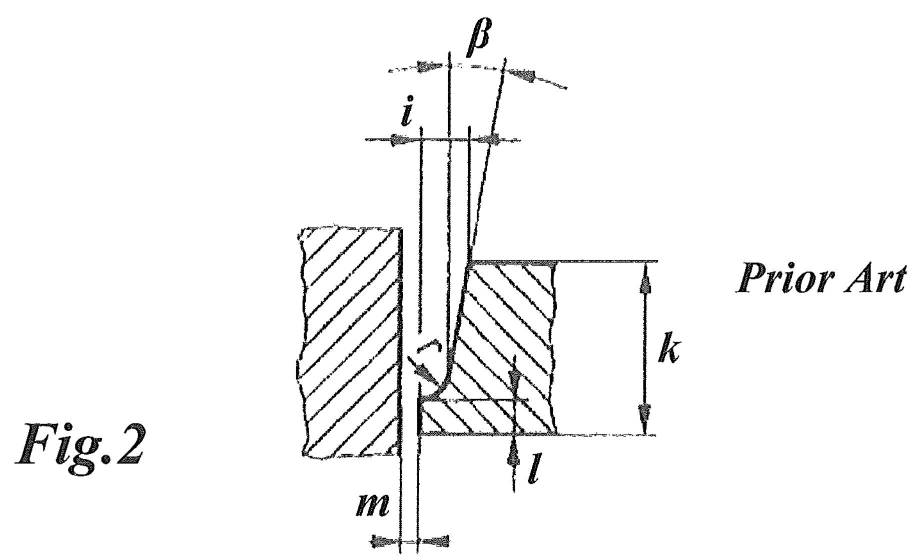
FIG. 2 shows the geometry of joint preparation according to DIN EN ISO 9692-2 that had to be done in the prior art after TIG welding.
Figure 3:
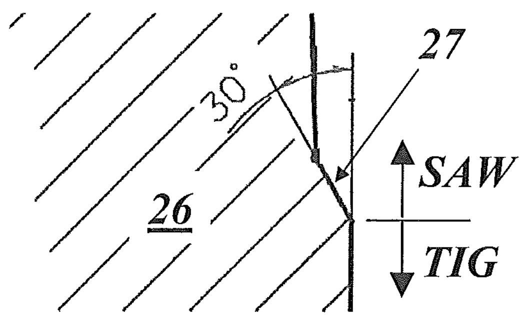
FIG. 3 shows an example of a first attempt for the transition from TIG to SAW in order to avoid machining between TIG and SAW process.

In a first attempt, for the transition from TIG to SAW a U shape with V root 27 with an opening of about 30° to the vertical similar to DIN EN ISO 9692-2 was selected at rotor disc 26 (see FIG. 3). However, this was considered not appropriate, as occasionally a high amount of indications in the transition zone TIG to SAW was found by NDT (US) up to unacceptable indications which needed to be reworked (removal and re-weld).

Also the second attempt with a V root to the full SAW width gave unsatisfactory NDT results.

Figure 4:
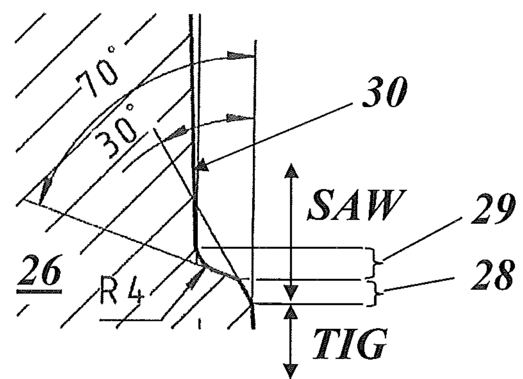
FIG. 4 an embodiment of the transition from TIG to SAW section in the rotor disc welding joint according to the invention.

The finally selected geometry with continuous good NDT results is shown in FIG. 4. It is essentially a combination of a first opening 28 with about 30° to the vertical (radial direction with respect to the rotor axis) for a height of 3 mm followed by a second opening 29 of about 70° to the vertical going with a predetermined radius R of about, preferably equal to, 4 mm (R4) into the sidewall 30 of the SAW weld.

Advantage:

The advantage of the current invention are the better NDT results achieved compared to the up to now used joint preparation without machining between TIG and SAW with avoidance of the additional machining costs and additional lead time requested for SAW joint preparation after TIG welding.

Main Application:

Use for current and future rotors of Gas Turbines, Steam Turbines and Turbogenerators.

The invention claimed is:

1. A method for welding rotors for power generation having a plurality of rotor discs arranged along a rotor axis, said method comprising:

providing forged and NDT tested rotor discs;

machining said discs for weld seam preparation, said weld seam preparation comprising an inner narrow TIG welding gap and an adjoining outer SAW welding gap;

stapling the discs on top of each other;

checking the run-out of the stapled discs relative to each other and as a whole and, if necessary, adjusting the staple;

melting the root of the weld without weld filler using TIG welding;

increasing the weld height by narrow gap TIG welding with parent metal weld filler to allow tilting of the rotor in horizontal position.

tilting the rotor in horizontal position;

finalizing the welding by filling the outer SAW welding gap using SAW welding; and checking the welds of the rotor by NDT using ultrasonic testing; and preparing an optimized transition geometry of TIG welding gap to SAW welding gap transition with a first opening having a first opening angle and a second opening having a second opening angle greater than said first opening angle.

2. The method as claimed in claim 1, wherein said first opening has a V shape.

3. The method as claimed in claim 2, wherein said first opening has an opening angle with about 30° to the vertical.

4. Method as claimed in claim 2, characterized in that said first opening has a height of a few mm, preferably 3 mm.

5. The method as claimed in claim 1, wherein said second opening has a V shape and goes with a predetermined radius (R) into the sidewall of the SAW welding gap.

6. The method as claimed in claim 5, wherein said second opening has an opening angle with about 70° to the vertical.

7. The method as claimed in claim 5, wherein the predetermined radius (R) is about 4 mm.

* * * * *